US008957603B2

United States Patent
Kim et al.

(10) Patent No.: US 8,957,603 B2
(45) Date of Patent: Feb. 17, 2015

(54) LED LIGHTING CONTROL APPARATUS AND METHOD BASED ON VISIBLE LIGHT COMMUNICATION

(71) Applicant: Electronics and Telecommunications Research Institute, Daejeon (KR)

(72) Inventors: You-Jin Kim, Daejeon (KR); Tae-Gyu Kang, Daejeon (KR); Hyun-Jong Kim, Cheongju-si (KR); In-Su Kim, Daejeon (KR); Dae-Ho Kim, Daejeon (KR); Il-Soon Jang, Daejeon (KR); Jin-Doo Jeong, Daejeon (KR); Sang-Kyu Lim, Daejeon (KR); Seong-Hee Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 53 days.

(21) Appl. No.: 13/793,769

(22) Filed: Mar. 11, 2013

(65) Prior Publication Data

US 2013/0234607 A1   Sep. 12, 2013

(30) Foreign Application Priority Data

Mar. 12, 2012   (KR) ........................ 10-2012-0025068

(51) Int. Cl.
  *H05B 41/38*   (2006.01)
  *H05B 33/08*   (2006.01)
  *H05B 37/02*   (2006.01)

(52) U.S. Cl.
  CPC ........ *H05B 33/0854* (2013.01); *H05B 37/0218* (2013.01); *H05B 37/0272* (2013.01); *Y02B 20/46* (2013.01)
  USPC .......................... 315/294; 315/291; 315/158

(58) Field of Classification Search
  CPC ............. H05B 37/029; H05B 37/0254; H05B 33/0815; B60R 1/10
  USPC ........................... 314/291, 294, 158; 348/148
  See application file for complete search history.

(56) References Cited

U.S. PATENT DOCUMENTS 5,594,786 A * 1/1997 Chaco et al. ................ 379/93.09
8,000,897 B2 * 8/2011 Breed et al. .................... 701/301

(Continued)

FOREIGN PATENT DOCUMENTS

KR   1020060134238 A   12/2006
KR     100991062 B1    10/2010

OTHER PUBLICATIONS

Mitsunori Miki et al., Intelligent Lighting System using Visible-Light Communication Technology, CIS, 2006, p. 1-6.

*Primary Examiner* — Douglas W Owens
*Assistant Examiner* — Syed M Kaiser
(74) *Attorney, Agent, or Firm* — William Park & Associates Patent Ltd.

(57) ABSTRACT

Disclosed herein is an LED lighting control apparatus and method based on visible light communication. The LED lighting control apparatus includes lighting information collection means for collecting status information about lighting means and environmental information about surroundings of the lighting means, and transmitting the collected information to lighting control means. The lighting information collection means includes a visible light reception processing unit for receiving the status information about the lighting means contained in a visible light signal emitted from the lighting means, a lighting information analysis unit including a plurality of environmental information sensors for detecting the environmental information about the surroundings of the lighting means, the lighting information analysis unit analyzing the environmental information detected by the environmental information sensors, and a lighting information control unit for collecting the status information and the analyzed environmental information and transmitting the collected information to the lighting control means.

15 Claims, 7 Drawing Sheets

(56) References Cited

U.S. PATENT DOCUMENTS

| | | | |
|---|---|---|---|
| 8,027,096 B2* | 9/2011 | Feng et al. | 359/666 |
| 8,179,437 B2* | 5/2012 | Schofield et al. | 348/148 |
| 8,508,593 B1* | 8/2013 | Schofield et al. | 348/148 |
| 8,519,566 B2* | 8/2013 | Recker et al. | 307/64 |
| 8,521,035 B2* | 8/2013 | Knapp et al. | 398/172 |
| 8,525,673 B2* | 9/2013 | Tran | 340/540 |
| 8,610,376 B2* | 12/2013 | Chemel et al. | 315/308 |
| 8,610,377 B2* | 12/2013 | Chemel et al. | 315/308 |
| 8,653,959 B2* | 2/2014 | Lynam et al. | 340/438 |
| 8,687,282 B2* | 4/2014 | Feng et al. | 359/666 |
| 8,749,633 B2* | 6/2014 | Schofield et al. | 348/148 |
| 2008/0231704 A1* | 9/2008 | Schofield et al. | 348/148 |
| 2010/0301770 A1* | 12/2010 | Chemel et al. | 315/294 |
| 2011/0222849 A1 | 9/2011 | Han et al. | |
| 2013/0188968 A1* | 7/2013 | Kim et al. | 398/182 |
| 2013/0234607 A1* | 9/2013 | Kim et al. | 315/158 |

\* cited by examiner

LED LIGHTING CONTROL APPARATUS AND METHOD BASED ON VISIBLE LIGHT COMMUNICATION

CROSS REFERENCE TO RELATED APPLICATION

This application claims the benefit of Korean Patent Application No. 10-2012-0025068, filed on Mar. 12, 2012, which is hereby incorporated by reference in its entirety into this application.

BACKGROUND OF THE INVENTION

1. Technical Field

The present invention relates generally to a Light-Emitting Diode (LED) lighting control apparatus and method based on visible light communication. More particularly, the present invention relates to an apparatus and method that collect status information about a lighting means and environmental information about the surroundings of the lighting means, and then control lighting based on visible light communication.

2. Description of the Related Art

A lighting means that uses a Light-Emitting Diode (LED) as a light source can realize visible light communication (hereinafter referred to as "VLC") by utilizing fast ON/OFF operations of the LED light source.

The VLC technology applied to a lighting means which uses an LED light source is limited in that communication is possible only in an area receiving the light, and a central processing unit can merely recognize status information about the lighting means over a lighting control network Further, such VLC technology is inconvenient in that in order to examine whether the desired illuminance has been output from a corresponding lighting means, illuminance is manually measured using an illuminance meter (a lux meter) under the corresponding lighting means, and in that the CPU newly controls lighting based on the values measured by the lux meter.

The invention according to conventional technology is disclosed in Korean Patent No. 10-0991062 entitled "Light transmission apparatus for visible light communication and method of controlling the power of visible light" The conventional technology relates to a light transmission apparatus for visible light communication and a method of controlling the power of visible light. In this invention, the light transmission apparatus includes a power conversion unit for supplying Direct Current (DC) power to a lighting LED lamp, a driving unit driven in switching drive mode and configured to supply operating current to the lighting LED lamp, an encoding unit connected to an external network and configured to receive and code data and provide coded data to the driving unit, and a control unit for controlling the operations of the power conversion unit, the driving unit, and the encoding unit. This invention provides the method of controlling the power of visible light using visible light communication technology, but it does not disclose a method of transmitting and receiving lighting status information and controlling lighting.

SUMMARY OF THE INVENTION

Accordingly, the present invention has been made keeping in mind the above problems occurring in the prior art, and an object of the present invention is to provide an LED lighting control apparatus and method based on visible light communication, which efficiently control a lighting means by transmitting and receiving environmental information about surroundings and status information about the lighting means over a communication network configured based on visible light communication, thus reducing power consumption of the lighting means and ultimately saving energy.

Another object of the present invention is to provide an LED lighting control apparatus and method based on visible light communication, which can individually control only a corresponding lighting means using the unique ID information of the lighting means, thus maximizing the convenience of a user.

In accordance with an aspect of the present invention to accomplish the above objects, there is provided a Light-Emitting Diode (LED) lighting control apparatus based on visible light communication, including lighting information collection means for collecting status information about lighting means and environmental information about surroundings of the lighting means, and transmitting the collected information to lighting control means, thus enabling the lighting means to be controlled by the lighting control means, wherein the lighting information collection means includes a visible light reception processing unit for receiving the status information about the lighting means contained in a visible light signal emitted from the lighting means; a lighting information analysis unit including a plurality of environmental information sensors for detecting the environmental information about the surroundings of the lighting means, the lighting information analysis unit analyzing the environmental information detected by the environmental information sensors; and a lighting information control unit for collecting the status information about the lighting means and the analyzed environmental information and transmitting the collected information to the lighting control means.

Preferably, the visible light reception processing unit may demodulate the visible light signal received via a visible light receiving sensor and then receive a status information signal from the visible light signal.

Preferably, the lighting information analysis unit may analyze variations in a status of the surroundings of the lighting means in real time by detecting one or more of pieces of environmental information corresponding to temperature, humidity, illuminance, motions, and an occurrence of a fire in the surroundings using the environmental information sensors.

Preferably, the lighting information collection means may further include a self-charging unit for converting the visible light signal emitted from the lighting means into electrical energy and then supplying power; a visible light transmission processing unit for transmitting a control signal for the lighting information control unit via a visible light-emitting unit; an infrared light transmission processing unit for transmitting a control signal for the lighting information control unit via an infrared light-emitting unit; a beacon signal transmission processing unit for detecting an LED beacon signal from patterns of light emitted from the lighting means; and a Radio Frequency (RF) transceiver unit for transmitting a control signal for the lighting information control unit and converting the control signal into an RF signal.

Preferably, the lighting information collection means may further include a host interface unit for providing an interface with a host device; a power circuit unit for receiving power supplied by the host device; and a battery unit for receiving the power supplied by the self-charging unit Preferably, the lighting means may include an LED light source module having a status information sensor for detecting the status information about the lighting means; and a control module for controlling the LED light source module.

Preferably, the control module may include an image sensor circuit unit for receiving an image signal output from an image sensor of the LED light source module; a beacon signal detection unit for detecting an LED beacon signal from the image signal; a visible light signal reception unit for receiving the visible light signal emitted from the LED light source module; an RF transceiver unit for converting the visible light signal into an RF signal; and an ID setting unit for setting unique ID information of the LED light source module.

Preferably, the control module may include a lighting information analysis unit for analyzing the status information detected by the status information sensor; a lighting control unit for controlling transmission and reception of an LED beacon signal and the status information based on unique ID information of the LED light source module, or controlling the LED light source module based on a control signal transmitted from the lighting control means; and a lighting communication processing unit for processing transmission and reception of the status information based on the unique ID information or of the control signal.

Preferably, the status information sensor may include information corresponding to any one of ON/OFF status, temperature, voltage, current, illuminance, and color of lighting.

Preferably, if a plurality of lighting means are provided, the lighting means may be mutually connected via an integrated control communication network using a lighting control bus.

Preferably, the lighting control means may generate a control command signal for ON/OFF operations, illuminance, color, group or individual control of the lighting means, based on the status information and the analyzed environmental information, and transmits the control command signal, thus controlling the lighting means.

In accordance with another aspect of the present invention to accomplish the above objects, there is provided a Light-Emitting Diode (LED) lighting control method based on visible light communication, including receiving status information about lighting means contained in visible light emitted from the lighting means; analyzing environmental information detected by environmental information sensors for detecting environmental information about surroundings of the lighting means; and collecting the status information and the analyzed environmental information, transmitting the collected information to lighting control means, and then enabling the lighting means to be controlled by the lighting control means.

Preferably, the receiving the status information about the lighting means contained in the visible light emitted from the lighting means may be configured such that one or more of pieces of information corresponding to ON/OFF status, temperature, voltage, current, illuminance, and color of the lighting means are received by a status information sensor provided in the lighting means.

Preferably, the analyzing the environmental information detected by the environmental information sensors for detecting environmental information about surroundings of the lighting means may be configured to detect one or more of pieces of environmental information corresponding to temperature, humidity, illuminance, motions, and an occurrence of a fire in the surroundings using the environmental information sensors, thus analyzing variations in a status of the surroundings of the lighting means in real time.

Preferably, the collecting the status information and the analyzed environmental information, transmitting the collected information to lighting control means, and then enabling the lighting means to be controlled by the lighting control means may be configured such that the lighting control means generates a control command signal for ON/OFF operations, illuminance, color, group or individual control of the lighting means, based on the status information and the analyzed environmental information, and transmits the control command signal, thus controlling the lighting means.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Preferred embodiments of the present invention will be described in detail below with reference to the accompanying drawings to such an extent that those skilled in the art can easily implement the technical spirit of the present invention. Reference now should be made to the drawings, in which the same reference numerals are used throughout the different drawings to designate the same or similar components. In the following description, redundant descriptions and detailed descriptions of known elements or functions that may unnecessarily make the gist of the present invention obscure will be omitted.

Hereinafter, an LED lighting control apparatus and method based on visible light communication according to an embodiment of the present invention will be described in detail with reference to the attached drawings.

Figure 1:
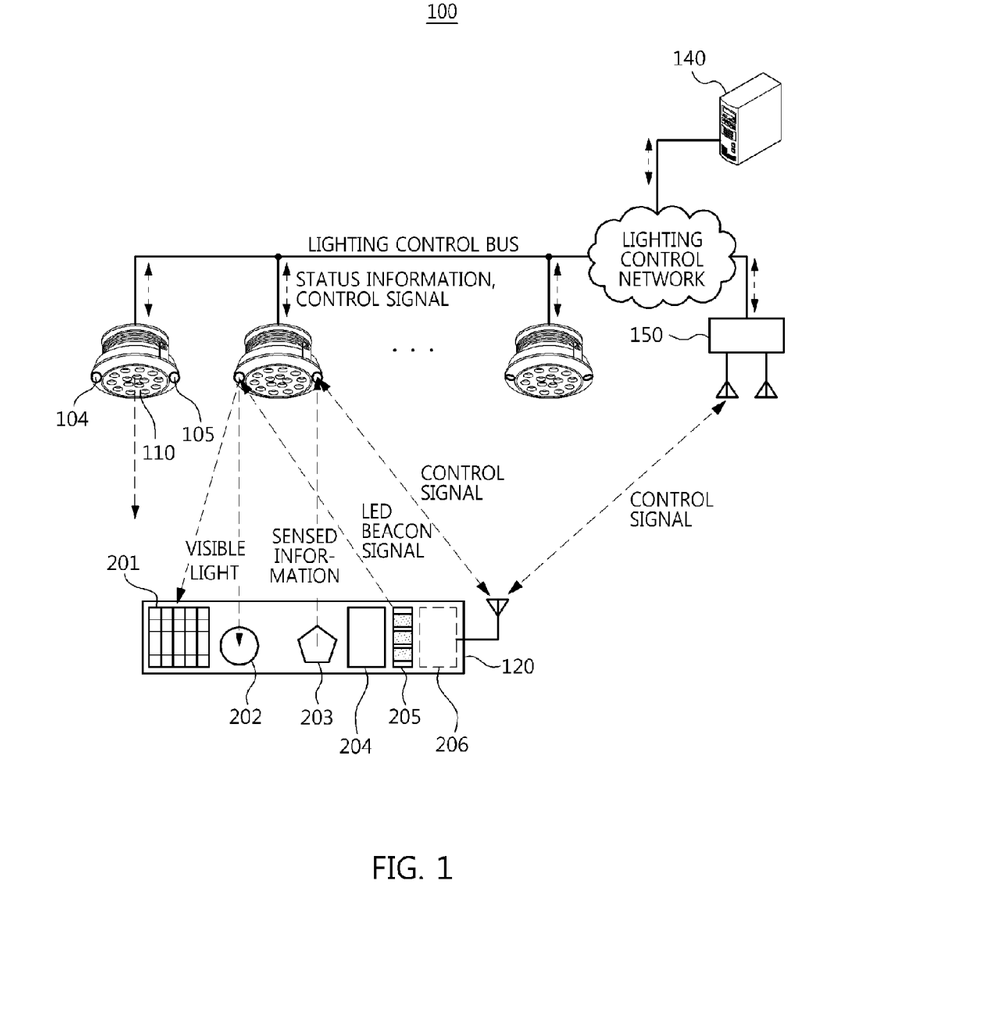
FIG. 1 is a diagram showing the configuration of an LED lighting control apparatus based on visible light communication according to an embodiment of the present invention.
Figure 2:
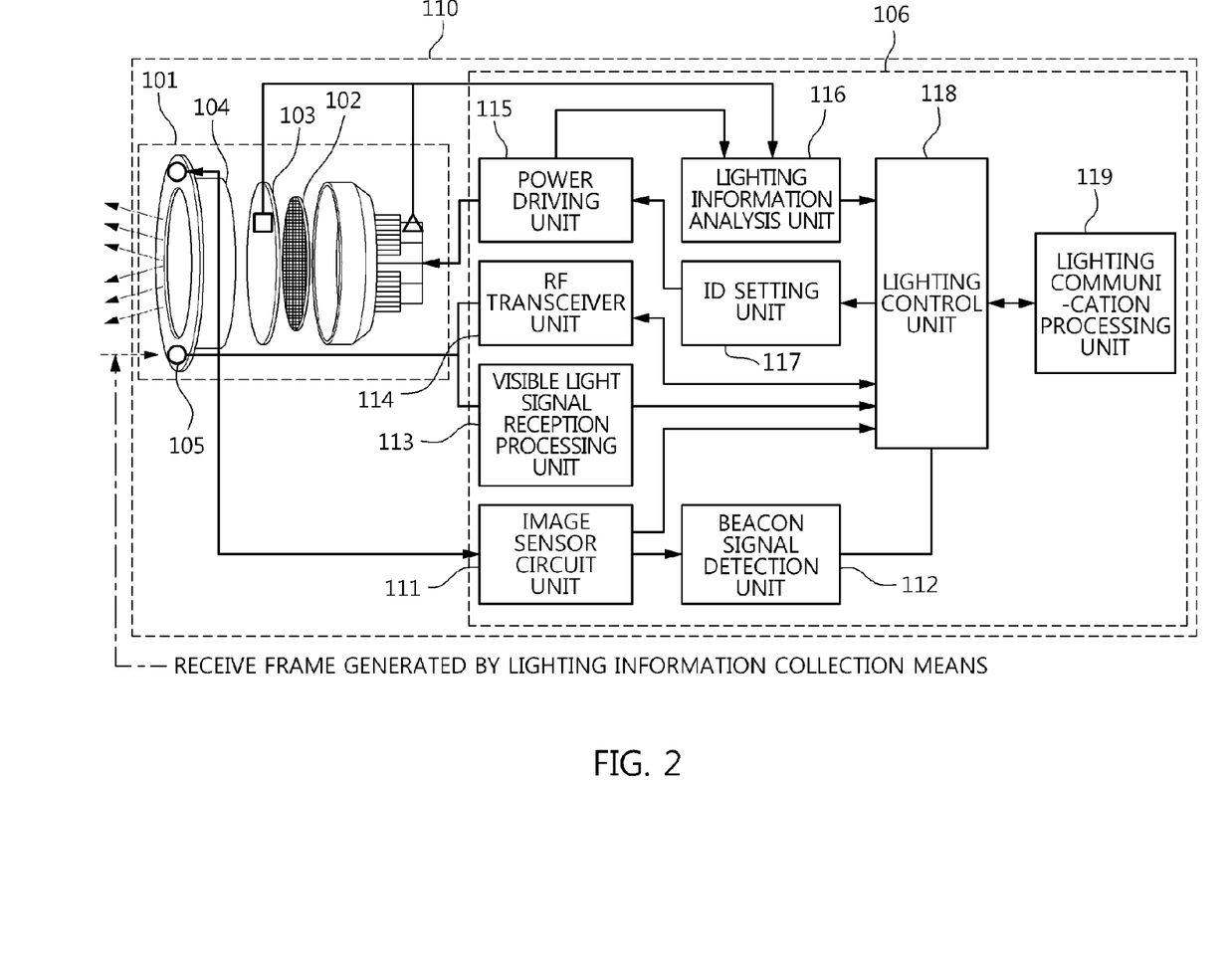
FIG. 2 is a diagram showing the detailed configuration of the lighting means of the LED lighting control apparatus based on visible light communication according to an embodiment of the present invention.
Figure 3:
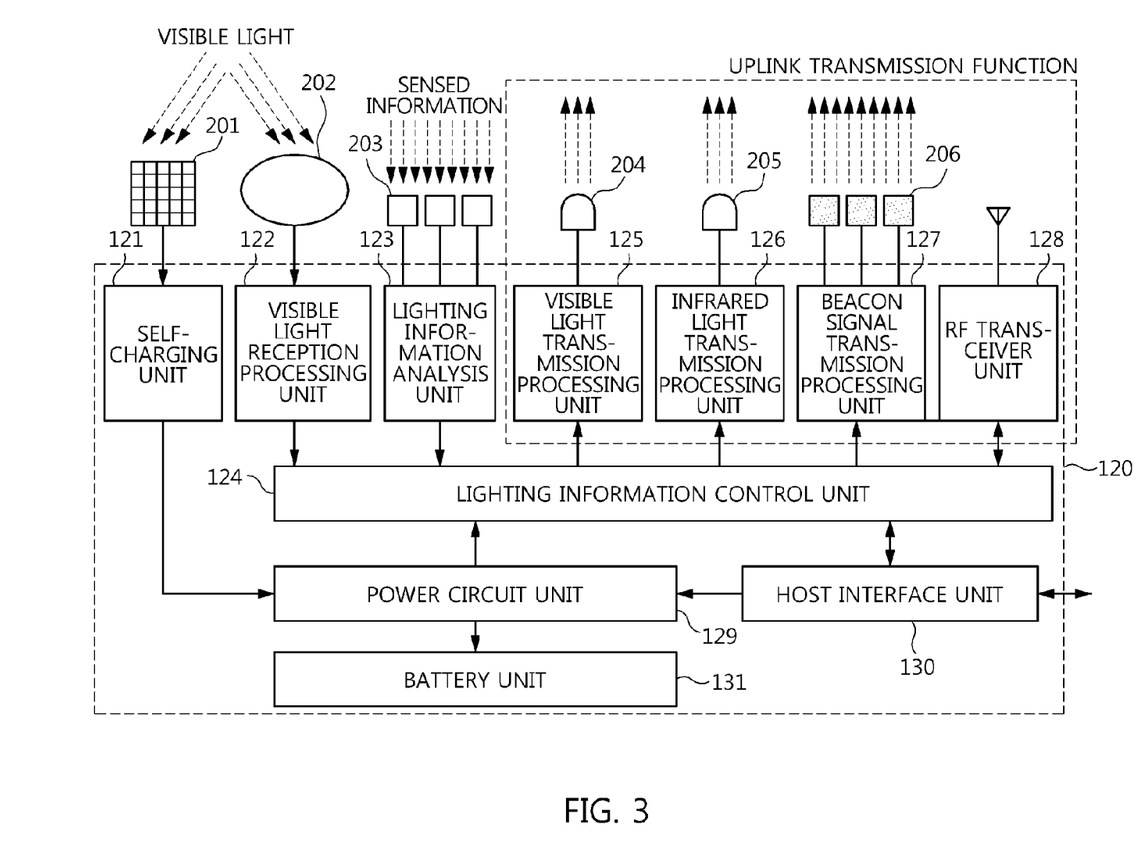
FIG. 3 is a diagram showing the detailed configuration of the lighting information collection means of the LED lighting control apparatus based on visible light communication according to an embodiment of the present invention.

FIG. 1 is a diagram showing the configuration of an LED lighting control apparatus based on visible light communication according to an embodiment of the present invention, FIG. 2 is a diagram showing the detailed configuration of the lighting means of the LED lighting control apparatus based on visible light communication according to an embodiment of the present invention, and FIG. 3 is a diagram showing the detailed configuration of the lighting information collection means of the LED lighting control apparatus based on visible light communication according to an embodiment of the present invention.

Referring to FIGS. 1 to 3, an LED lighting control apparatus 100 according to the present invention mainly includes a plurality of lighting means 110, a lighting information collection means 120, and a lighting control means 140.

Each lighting means 110 according to the present invention is connected to the lighting control means 140 over an integrated control communication network that uses a lighting control bus enabling bidirectional communication. Accordingly, the lighting control means 140 can control the lighting means 110 either depending on the scheduling of a user or depending on status information and environmental information transmitted from the lighting information collection means 120.

The lighting means 110 emits visible light so as to function as a lighting apparatus, and performs visible light communication using ON/OFF signals for the visible light. That is, the lighting means 110 transmits unique identification (ID) information and status information about the lighting means to the lighting information collection means 120 using visible light communication.

For this operation, the lighting means 110 includes an LED light source module 101 having a status information sensor 103 and a control module 106 for controlling the LED light source module 101.

The LED light source module 101 includes an LED light source 102, the status information sensor 103 disposed on the LED light source 102, and an image sensor 104 disposed on the front surface of the LED light source 102. In this case, the status information sensor 103 is implemented as one of a color sensor, an illuminance sensor, and a temperature sensor, and provides status information including one or more of ON/OFF status, temperature, voltage, current, illuminance, and color of the lighting.

The control module 106 includes an image sensor circuit unit 111, a beacon signal detection unit 112, a visible light signal reception processing unit 113, a Radio Frequency (RF) transceiver unit 114, an ID setting unit 117, a lighting information analysis unit 116, a power driving unit 115, a lighting control unit 118, and a lighting communication processing unit 119.

The image sensor circuit unit 111 receives image signals output from the image sensor 104 of the LED light source module 101. The beacon signal detection unit 112 detects an LED beacon signal from the image signals. In this case, the beacon signal detection unit 112 converts the LED beacon signal into a format that can be decrypted by the lighting control means 140 and transmits a resulting LED beacon signal. The visible light signal reception processing unit 113 receives a visible light signal from the light emitted from the LED light source module 101. The RF transceiver unit 114 converts the visible light signal into an RF signal. In this case, the RF transceiver unit 114 uses RF communication technology, such as Wireless-Fidelity (Wi-Fi), ZigBee, or Wideband Code Division Multiple Access (WCDMA) communication. Further, the RF transceiver unit 114 transmits signals by means of a connection with a gateway 150 that is connected to a separate lighting control network The ID setting unit 117 transfers a unique ID setting signal received from the lighting control means 140 to the lighting control unit so as to generate the unique ID information of the lighting.

The lighting information analysis unit 116 analyzes the status information detected by the status information sensor 103. The power driving unit 115 transmits information, detected by the ID setting unit and the lighting information analysis unit 116, to the LED light source module 101 as the power of the lighting means 110 is driven. The status information of the power driving unit 115 is transferred to the lighting information analysis unit 116, and information about the driving of power is reported to the lighting control means 140. The lighting control unit 118 controls the transmission/reception of the LED beacon signal and status information based on the unique ID information of the LED light source module 101, or controls the LED light source module 101 based on a control signal transmitted from the lighting control means 140. The lighting communication processing unit 119 processes the transmission/reception of status information based on the unique ID or the control signal.

The lighting information collection means 120 collects status information about the lighting means 110 and environmental information about the surroundings of the lighting means 110, and transmits the collected information to the lighting control means 140, so that the lighting means 110 is controlled by the lighting control means 140.

For this operation, the lighting information collection means 120 includes a self-charging unit 121, a visible light reception processing unit 122, a lighting information analysis unit 123, a lighting information control unit 124, a visible light transmission processing unit 125, an infrared light transmission processing unit 126, a beacon signal transmission processing unit 127, an RF transceiver unit 128, a host interface unit 130, a power circuit unit 129, and a battery unit 131.

The self-charging unit 121 is connected to the power circuit unit 129 via a solar cell 201 for converting the visible light signal emitted from the LED light source module 101 into electrical energy, and then supplies power to the power circuit unit 129. That is, the visible light according to the present invention is operated in fast ON/OFF mode for visible light communication, which can be detected by the self-charging unit 121 via the solar cell 201. The visible light reception processing unit 122 demodulates the visible light signal received from a visible light-receiving sensor 202 and then receives a status information signal from the visible light signal. In this case, the term "demodulation" denotes the operation of restoring the received signal into an original signal. The lighting information analysis unit 123 analyzes environmental information detected by a plurality of environmental information sensors 203. Here, the environmental information sensors 203 are not limited to specific types of sensors, but include one or more of an illuminance sensor, a color sensor, a motion sensor, and a fire sensor, detect one or more of pieces of environmental information corresponding to the temperature, humidity, illuminance, motions, and the occurrence of a fire in the surroundings, and then analyze variations in the status of the surroundings of the lighting means 110 in real time. The lighting information control unit 124 collects the status information and the analyzed environmental information, and then transmits the collected information to the lighting control means 140 or controls the lighting information analysis unit 116.

The visible light transmission processing unit 125 transmits a control signal for the lighting information control unit 124 via a visible light-emitting unit 204. The infrared light transmission processing unit 126 transmits a control signal for the lighting information control unit 124 via an infrared light-emitting unit 205. The beacon signal transmission processing unit 127 detects an LED beacon signal from patterns of light emitted by a plurality of LEDs 206. In this case, the provided LEDs 206 can be arranged in various shapes, and display information so that the image sensor unit 104 can decode the information by means of the color variations and the ON/OFF operations of the respective LEDs 206. The RF transceiver unit 128 transmits a control signal for the lighting information control unit and then converts the control signal into an RF signal.

The host interface unit 130 provides an interface with a host device. The power circuit unit 129 converts power supplied by the host device into the form of current and voltage that can be used by the lighting information collection means 120. The battery unit 131 is supplied with the power provided by the self-charging unit 121.

Figure 4:
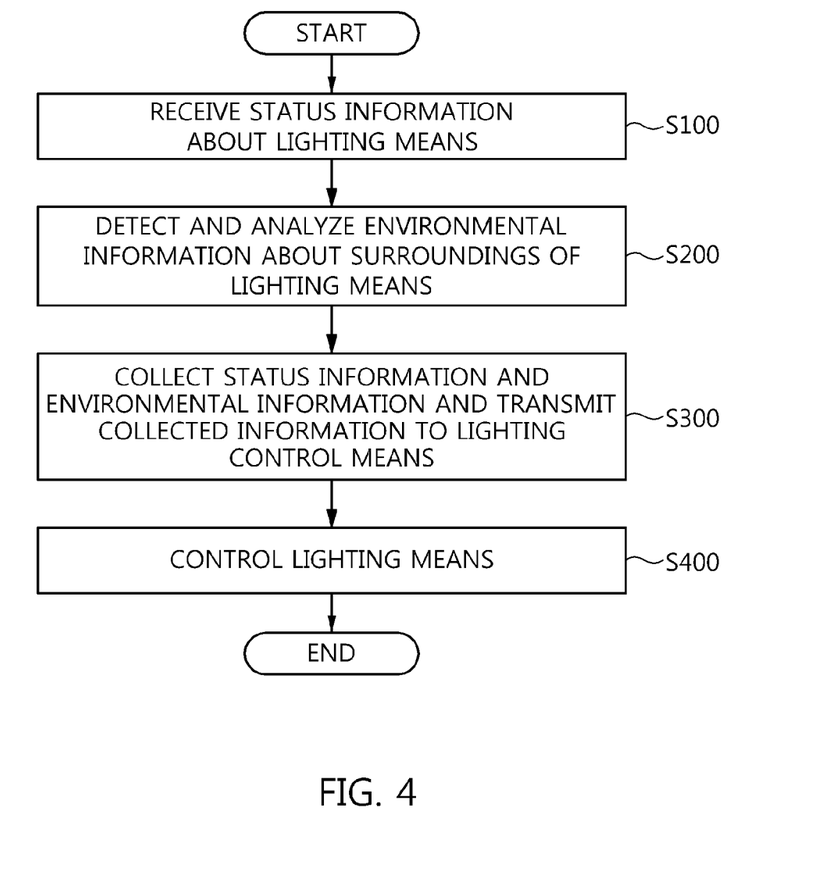
FIG. 4 is a schematic flowchart showing an LED lighting control method based on visible light communication according to an embodiment of the present invention.

FIG. 4 is a schematic flowchart showing an LED lighting control method based on visible light communication according to the present invention.

Referring to FIG. 4, status information about the lighting means 110, contained in visible light emitted from the lighting means 110, is received. This status information is information about one or more of ON/OFF status, temperature, voltage, current, illuminance and color of the lighting means 110, and the status information sensor 103 provided in the lighting means 110 can receive this state information at step S100.

Next, environmental information detected by the environmental information sensors 203 for detecting environmental information about the surroundings of the lighting means 110 is analyzed at step S200. The environmental information sensors 203 detect one or more of pieces of environmental information corresponding to the temperature, humidity, illuminance, motions, and the occurrence of a fire in the surroundings, so that variations in the status of the surroundings of the lighting means 110 can be analyzed in real time.

Next, the status information and the analyzed environmental information are collected and are transmitted to the lighting control means 140, thus enabling the lighting means 110 to be controlled by the lighting control means 140 at step S300. The lighting control means 140 generates control command signals for the control of ON/OFF operations, illuminance, color, the group or individual control of the lighting means 110, on the basis of the status information and the analyzed environmental information, and can control the lighting means 110 by transmitting the control command signals at step S400.

Figure 5:
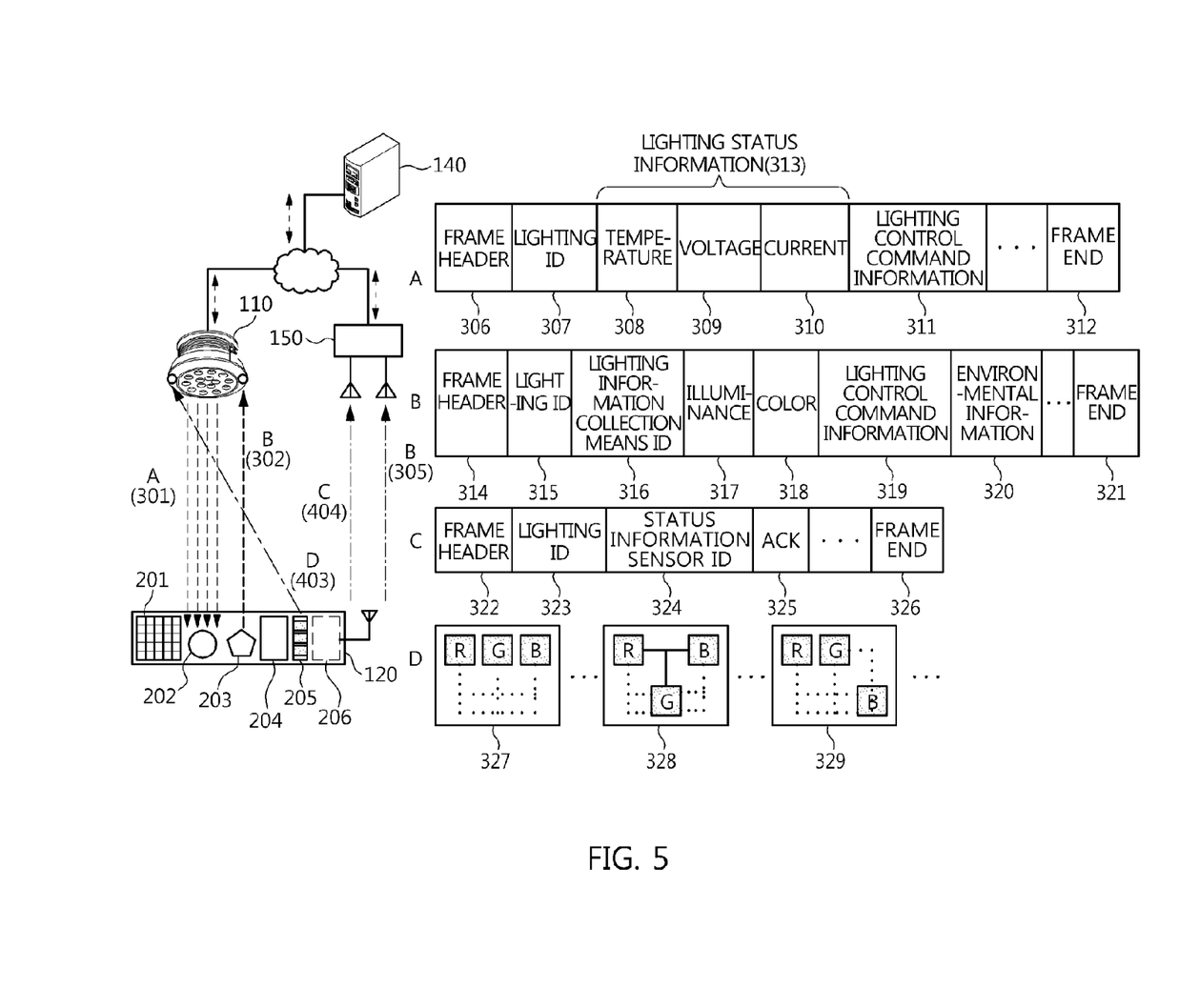
FIG. 5 is a diagram showing a status information transmission method using the unique ID information of lighting in the LED lighting control method based on visible light communication according to an embodiment of the present invention.

FIG. 5 is a diagram showing a status information transmission method using the unique ID information of the lighting in the LED lighting control method based on visible light communication according to the present invention.

Referring to FIG. 5, the message format of data 301 that is transmitted by the lighting means 110 using visible light has an exemplary format corresponding to {frame header 306, lighting ID 307, and temperature 308, voltage 309, and current 310 that are examples of indication of lighting status information 313, lighting control command information 311, frame end 312}. The configuration of the message frame is not limited to that of message frame A 301, and this illustrates an example of the message configuration that uses the unique ID information 307 and the status information 313 of the lighting.

Each message frame B 302 or 305 illustrates an example of the configuration of a message frame that is transmitted upon performing an uplink reception function. The message frame B 302 or 305 indicates an example corresponding to frame header 314, lighting ID 315, lighting information collection means ID 316, illuminance 317, color 318, lighting control command information 319, environmental information 320, and frame end 3211. The configuration of the message frame is not limited to that of the message frame B 302 or 305, and this illustrates an example of the message configuration of the invention that uses the unique ID information 315, status information sensor ID 316, illuminance 317, and color 318 of the lighting.

Message frame C 304 denotes a response frame received from the RF transceiver unit 114 or the RF gateway 150, and illustrates an example corresponding to {frame header 322, lighting ID 323, status information sensor ID 324, Acknowledgement (Ack) 325, and frame end 326}. The configuration of the message frame is not limited to that of the message frame C 304, and this illustrates an example of the message configuration of the invention that uses the unique ID information 323 and the status information sensor ID 324 of the lighting.

Figure 6:
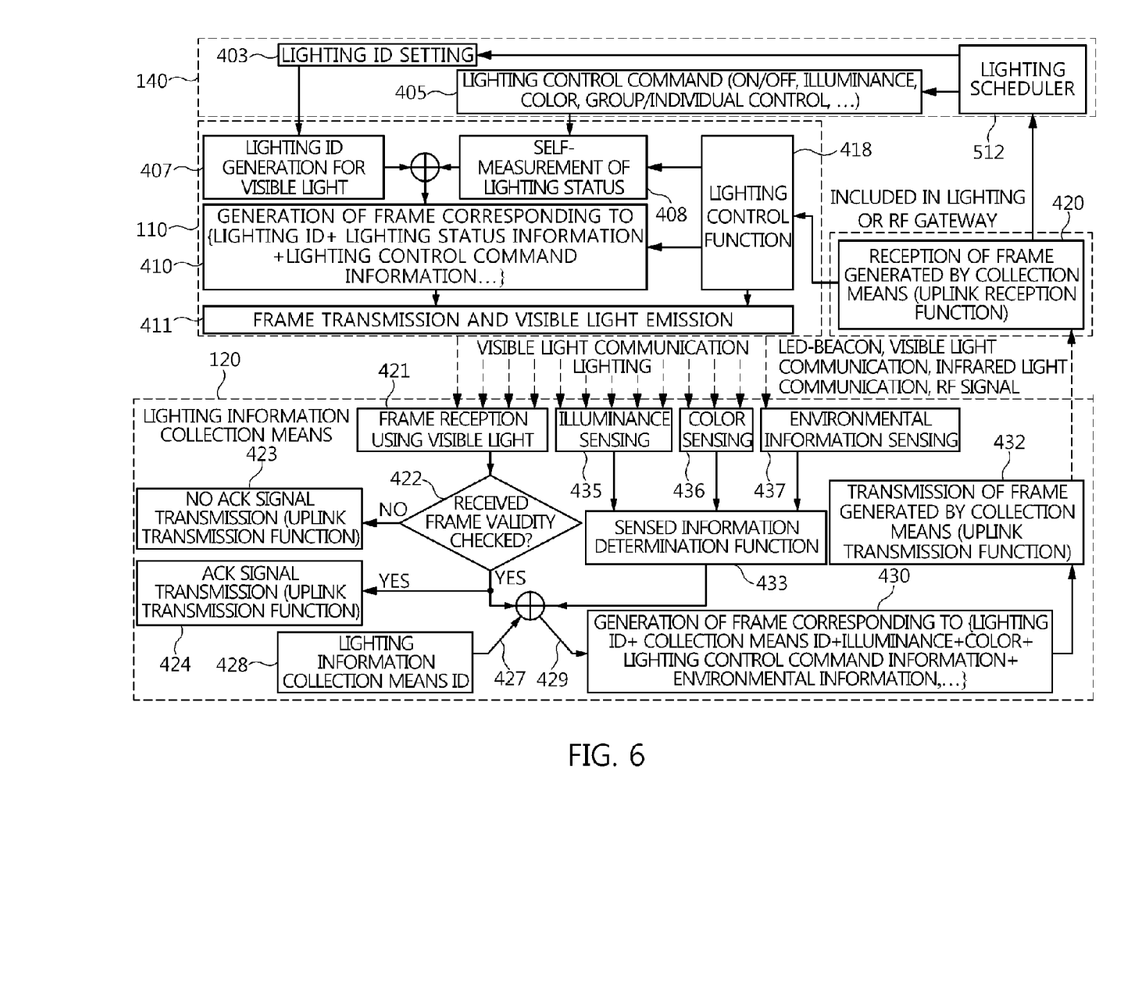
FIG. 6 is a diagram showing in detail a method of measuring and controlling status information in the LED lighting control method based on visible light communication according to an embodiment of the present invention.

FIG. 6 is a diagram showing in detail a method of measuring and controlling status information in the LED lighting control method based on visible light communication according to the present invention.

Referring to FIG. 6, the lighting control means 140 transmits unique ID setting information 403 and control signals 405 for the lighting means 110 to the lighting means 110. Here, the control signals are command signals that enable the control of ON/OFF operations, illuminance, color of the lighting means 110, or the group/individual control of the lighting means 110, and are not limited to specific lighting control command signals in the present invention.

The lighting means 110 receives unique ID setting information 404 for lighting from the lighting control means 140, and generates a piece of unique ID information for each LED light source module 101 (407). Further, the lighting means 110 itself detects the status of the lighting using the status information sensor 103 in response to the received control signals (408).

The unique ID information 407 and the status information 408 of the lighting detected by the lighting means 110 are applied to the generation of a frame corresponding to {unique ID information+status information+control signal information} (410). The generated frame is provided and transmitted to a block for a frame transmission and visible light-emitting function 411. In this case, the lighting control means 140 performs a control function 418 for transmission and light emission 411. The lighting means 110 has an uplink reception function 420, and results 419 obtained by performing this function are transmitted to the lighting control means 140. In this case, the uplink reception function of the lighting means 110 can be performed using one of four methods such as LED-beacon, visible light communication, infrared light communication, and RF signal communication, or using two or more of the four methods.

The lighting information collection means 120 receives a frame using visible light emitted from the lighting means 110, checks the validity of the received frame (422), and transmits a No Ack (Hack) signal if an error has occurred on the received frame or if the checking of validity of the frame has failed (423). If the checking of the validity of the received frame has succeeded, the lighting information collection means 120 sends an Ack signal (424). In this case, the visible light is sensed (433) together with environmental information sensed by an illuminance sensor 435, a color sensor 436, and other types of environmental information sensors 437 (for example, motion, temperature, etc.).

If the frame using the visible light is received without causing any errors, the sensed information is added to information about the collection means ID 427 of the lighting information collection means 120, so that a frame 430 corresponding to {unique ID information+ID of collection means 120+illuminance information +color information+control signal information+environmental information, . . . } is generated. The generated frame 430 is transmitted using the uplink transmission function 432 of the lighting information collection means 120.

Figure 7:
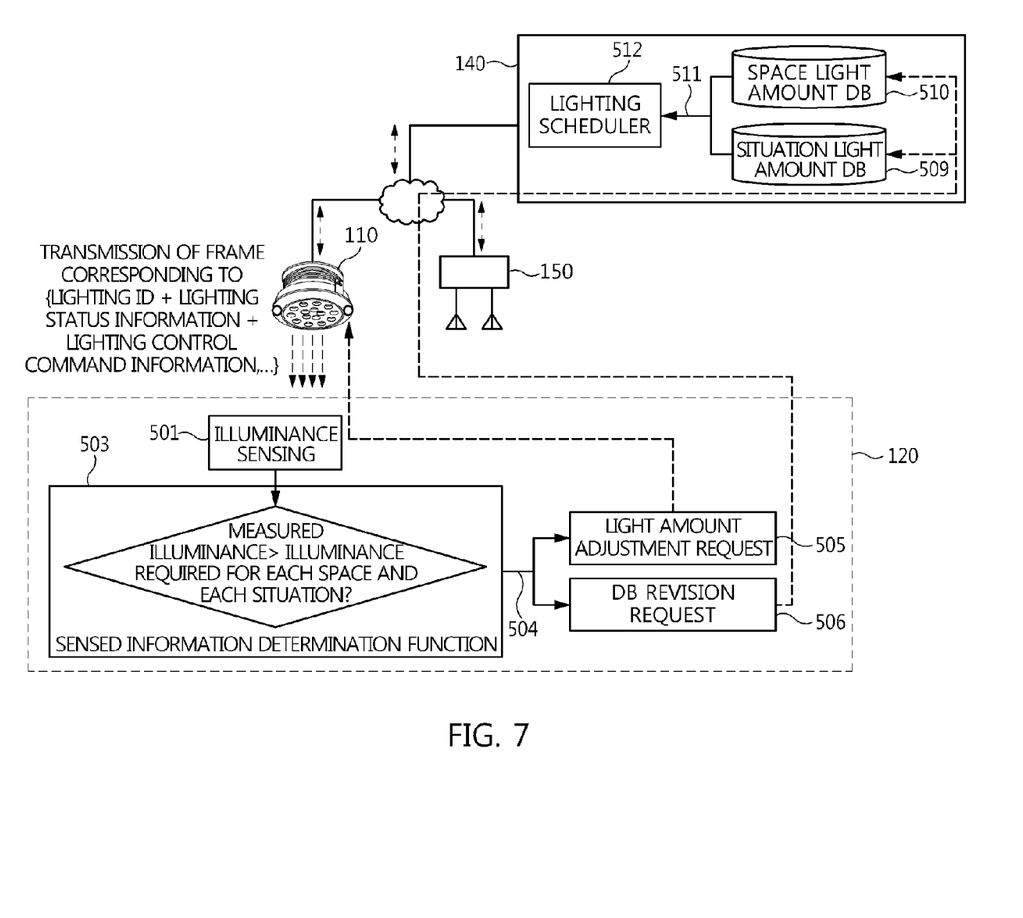
FIG. 7 is a diagram showing a method of measuring illuminance and controlling energy reduction in the LED lighting control method based on visible light communication according to an embodiment of the present invention.

FIG. 7 is a diagram showing a method of measuring illuminance and controlling energy reduction in the LED lighting control method based on visible light communication according to the present invention.

Referring to FIG. 7, when a frame corresponding to {unique ID information+status information+control signal information} is transmitted from the lighting means 110, an illuminance sensor 501 receives an illuminance value (502), and determines whether the measured illuminance is greater or less than the illuminance required for each space and each situation (503). If a request to adjust the amount of light (505) is made based on the results of the determination (504), transmission is performed using an uplink transmission function.

The lighting control means 140 stores the amount of light required for each corresponding space in the form of a database (DB) 510, and also stores the amount of light necessary for each required situation in the form of a DB 509. These two types of DB values are input (511), and then control signals for a lighting scheduler 512 are generated.

In this case, if a request to revise the DB (506) is made based on the results of the determination (504) by the lighting information control unit of the lighting information collection means 120, the revision of the space light amount DB 510 and the situation light amount DB 509 is requested using an uplink transmission function. In this case, the uplink transmission functions physically use the same method, but may logically have different paths.

As described above, the present invention can efficiently control lighting means by transmitting and receiving environmental information about surroundings and status information about the lighting means over a communication network configured based on visible light communication, thus reducing power consumption of the lighting means and ultimately saving energy.

According to the present invention, the following advantages can be expected.

The present invention is advantageous in that it efficiently controls lighting means by transmitting and receiving environmental information about surroundings and status information about the lighting means over a communication network configured based on visible light communication, thus reducing power consumption of the lighting means and ultimately saving energy.

Further, the present invention is advantageous in that pieces of unique ID information of a plurality of lighting means are used, so that, if necessary, only a corresponding lighting means can be individually controlled, thus maximizing the convenience of a user.

Furthermore, the present invention is advantageous in that bidirectional communication is performed in such a way that each lighting means transmits unique ID information and status information to a collection means using visible light communication, and the collection means integrates environmental information with the received unique ID information and status information and transmits the integrated information to a control means, thus enabling the centralized control and the distributed control of the lighting means to be simultaneously performed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A Light-Emitting Diode (LED) lighting control apparatus having a plurality of lighting means controlled based on visible light communication, the apparatus comprising:
   a lighting information collection means configured to collect status information about a lighting means and environmental information about surroundings of the lighting means, and to transmit the collected information to a lighting control means which is configured to control the lighting means,
   wherein the lighting information collection means comprises:
   a visible light reception processing unit configured to receive a modulated visible light signal emitted from an LED light source module of the lighting means, the modulated visible light signal being modulated with data comprising the status information;
   the visible light reception processing unit being further configured to demodulate the received modulated visible light signal to thereby produce the data comprising the status information;
   a lighting information analysis unit including a plurality of environmental information sensors which detect the environmental information about the surroundings of the lighting means, the lighting information analysis unit configured to analyze the environmental information detected by the environmental information sensors; and
   a lighting information control unit configured to collect the status information about the lighting means and the analyzed environmental information and to transmit the collected information to the lighting control means.

2. The LED lighting control apparatus of claim 1, wherein the visible light reception processing unit is further configured to demodulate the received modulated visible light signal which is modulated using ON/OFF signals.

3. The LED lighting control apparatus of claim 1, wherein the lighting information analysis unit analyzes variations in a status of the surroundings of the lighting means in real time by detecting one or more of pieces of environmental information corresponding to temperature, humidity, illuminance, motions, and an occurrence of a fire in the surroundings using the environmental information sensors.

4. The LED lighting control apparatus of claim 1, wherein the lighting information collection means further comprises:
   a self-charging unit for converting the visible light signal emitted from the lighting means into electrical energy and then supplying power to the lighting information collection means;
   a visible light transmission processing unit for transmitting a control signal for the lighting information control unit via a visible light-emitting unit;
   an infrared light transmission processing unit for transmitting a control signal for the lighting information control unit via an infrared light-emitting unit;
   a beacon signal transmission processing unit for detecting an LED beacon signal from patterns of light emitted from the lighting means; and
   a Radio Frequency (RF) transceiver unit for transmitting a control signal for the lighting information control unit and converting the control signal into an RF signal.

5. The LED lighting control apparatus of claim 4, wherein the lighting information collection means further comprises:

a host interface unit for providing an interface with a host device;

a power circuit unit for receiving power supplied by the host device; and a battery unit for receiving the power supplied by the self-charging unit.

6. The LED lighting control apparatus of claim 1, wherein the lighting means comprises:

the LED light source module having a status information sensor for detecting the status information about the lighting means; and a control module for controlling the LED light source module.

7. The LED lighting control apparatus of claim 6, wherein the control module comprises:

an image sensor circuit unit for receiving an image signal output from an image sensor of the LED light source module;

a beacon signal detection unit for detecting an LED beacon signal from the image signal;

a visible light signal reception unit for receiving the visible light signal emitted from the LED light source module;

an RF transceiver unit for converting the visible light signal into an RE signal; and an ID setting unit for setting unique ID information of the LED light source module.

8. The LED lighting control apparatus of claim 7, wherein the control module comprises:

the lighting information analysis unit for analyzing the status information detected by the status information sensor;

a lighting control unit for controlling transmission and reception of an LED beacon signal and the status information based on unique ID information of the LED light source module, or controlling the LED light source module based on a control signal transmitted from the lighting control means; and a lighting communication processing unit for processing transmission and reception of the status information based on the unique ID information or of the control signal.

9. The LED lighting control apparatus of claim 6, wherein the status information sensor includes information corresponding to any one of an ON/OFF status, a temperature, a voltage, a current, an illuminance, and a color of lighting.

10. The LED lighting control apparatus of claim 1, wherein if a plurality of lighting means are provided, the lighting means are mutually connected via an integrated control communication network using a lighting control bus.

11. The LED lighting control apparatus of claim 1, wherein the lighting control means generates a control command signal for ON/OFF operations, illuminance, color, group or individual control of the lighting means, based on the status information and the analyzed environmental information, and transmits the control command signal, thus controlling the lighting means.

12. A Light-Emitting Diode (LED) lighting control method for a plurality of lighting means which are controlled based on visible light communication, the method comprising:

receiving a modulated visible light signal emitted from an LED light source module of a lighting means, the modulated visible light signal being modulate with data comprising status information;

demodulating the received modulated visible light signal to thereby produce the data comprising the status information;

analyzing environmental information detected by environmental information sensors for detecting environmental information about surroundings of the lighting means; and collecting the status information and the analyzed environmental information, transmitting the collected information to a lighting control means, and then enabling the lighting means to be controlled by the lighting control means.

13. The LED lighting control method of claim 12, further comprising receiving the status information about the lighting means such that one or more of pieces of information corresponding to an ON/OFF status, a temperature, a voltage, a current, an illuminance, and a color of the lighting means are received by a status information sensor provided in the lighting means.

14. The LED lighting control method of claim 12, wherein the analyzing the environmental information detected by the environmental information sensors for detecting environmental information about surroundings of the lighting means is configured to detect one or more of pieces of environmental information corresponding to temperature, humidity, illuminance, motions, and an occurrence of a fire in the surroundings using the environmental information sensors, thus analyzing variations in a status of the surroundings of the lighting means in real time.

15. The LED lighting control method of claim 12, wherein the collecting the status information and the analyzed environmental information, transmitting the collected information to lighting control means, and then enabling the lighting means to be controlled by the lighting control means is configured such that the lighting control means generates a control command signal for ON/OFF operations, illuminance, color, group or individual control of the lighting means, based on the status information and the analyzed environmental information, and transmits the control command signal, thus controlling the lighting means.

* * * * *